Jan. 21, 1958
B. WALKER
2,820,668
MULTIPLE PURPOSE VEHICLE SEATS
Filed March 18, 1953
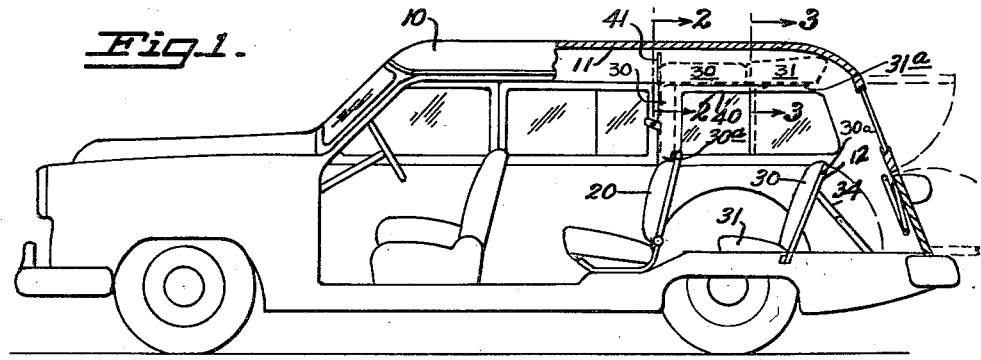
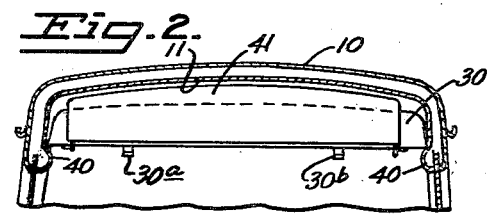
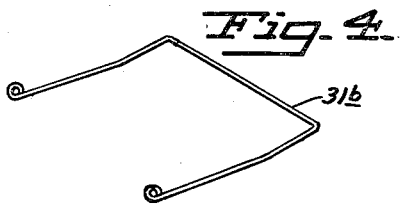
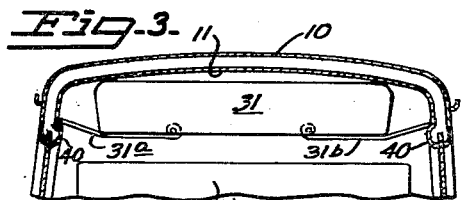
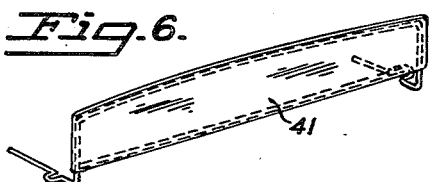
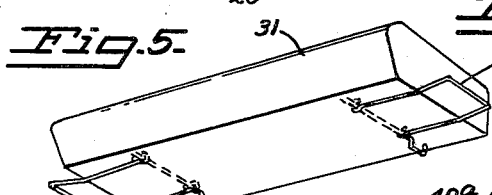
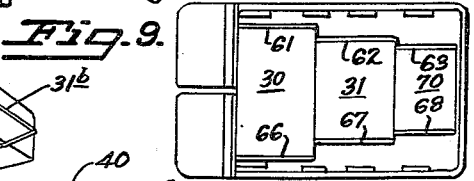
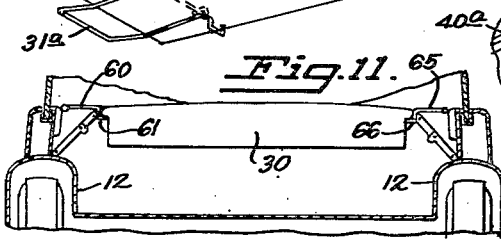
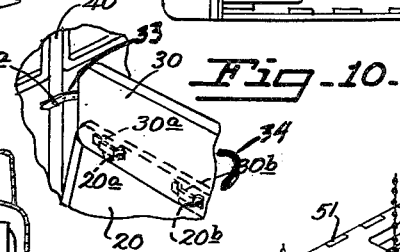
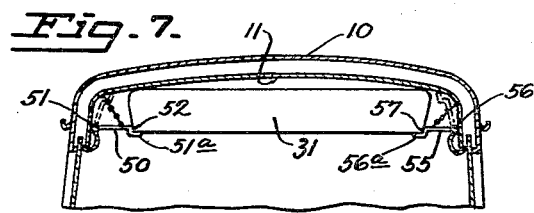
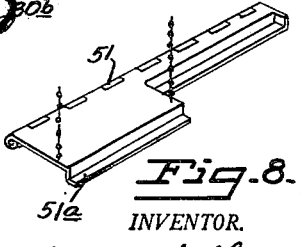
INVENTOR.
Brooks Walker

United States Patent Office 2,820,668
Patented Jan. 21, 1958

2,820,668

MULTIPLE PURPOSE VEHICLE SEATS

Brooks Walker, Piedmont, Calif.

Application March 18, 1953, Serial No. 343,109

3 Claims. (Cl. 296—69)

This invention pertains to improvement in seat cushions for vehicles and methods of storing them in the vehicles when not needed as cushions.

This invention also covers the use of seat cushions for more than one place in the vehicle and makes use of the cushions for forming shelves, higher backs to seats, and other uses.

Additional uses and features of this invention will be more particularly pointed out in the accompanying specifications and claims.

I have illustrated my invention by way of example in the accompanying drawings, in which:

Fig. 1 is a cutaway view of a vehicle employing one form of my invention.

Fig. 2 is an enlarged section taken at 2—2 of Fig. 1.

Fig. 3 is an enlarged section taken at 3—3 of Fig. 1.

Fig. 4 is an enlarged perspective view of a seat clip.

Fig. 5 is a perspective view of the third seat cushion.

Fig. 6 is an enlarged view of a rack for attachment to a seat cushion.

Fig. 7 is a transverse cross section of the upper portion of a vehicle showing another form of the invention.

Fig. 8 is an enlarged perspective view of a cushion adapter.

Fig. 9 is a reduced plan section view of the rear of a vehicle taken near the bottom of the rear side windows.

Fig. 10 is a cutaway view of the extension of the second seat back.

Figure 11 is a transverse cross section of the lower vehicle portion showing still another form of the invention.

In all figures like numerals of reference refer to corresponding parts in the various drawings.

In Figs. 1 through 6 I have illustrated a vehicle of the station wagon type with a body 10, a second seat back 20, a third seat back 30, a third seat cushion 31, interior rear window trim 40. Seat back 30 is long enough to be stowed above window trim 40. Rack 41 is attachable to seat 30 to prevent baggage from sliding forward when stored above seat 30 and below the interior top 11 of body 10. Seat cushion 31, being shorter than the width above window trim 40, has extension members 31a and 31b that in extended position rich to a point over the window trim on both sides of the body at the rear of body. This allows the seat cushion 31 to be stored above the window line at the top rear of the vehicle while seat back 30 can be stored just ahead of seat 31 and back of the head line of passengers in the second seat.

An alternate use of seat back cushion 30 is provided by utilizing clips or bent tongues 30a and 30b normally attached to seat back 30 for attaching said cushion to floor panels 12. The tongues 30a and 30b attach to brackets 20a and 20b (which, as shown in Fig. 10 are metal strips bent to provide an offset central portion between two side flanges, so as to define a tongue-receiving opening or pocket) above seat back 20 so that seat back 30 forms a higher back to the second seat and forms a head rest by using brackets 33 and 34 comprising swivel-mounted perforated tape (see Figs. 1 and 10), which secure seat 30 in adjustable position to the front of the rear window trim 40 at a button or other latch means 40a that locks into a perforation in the tape 33. This location of seat back 30 also provides an enclosure at the rear of the body where dogs can be carried and seat back 30 in this position forms a partition. Rear vision can be had by the driver by the use of an exterior mirror such as those used in trucks and vehicles having obstructed views back of the driver, as when the rear of a station wagon or passenger car is loaded with luggage, et cetera.

It is preferred that the bottom of seat back 30 and seat cushion 31 be trimmed or covered for better appearance. The extension members 31a and 31b are constructed to fold substantially flat under seat cushion 31 when used as a seat cushion for the third seat. Also, the tapes 33 and 34 are preferably swivel mounted on seat back 30 so that when used as a seat back for the third seat, said seat back will assume its normal position with said brackets 33 nested behind said seat back, as by folding them over 180° inwardly.

In Figs. 7 and 8 I show another construction where the width of the body when the seat cushions are to be stored is wider than the seat cushions; hinged or detachable chain-supported support brackets, such as 50 and 55, are hinged at 51 and 56 respectively; by withdrawing the hinge pin the support brackets 50 and 55 are also removable; dropped lips 51a and 56a respectively are adapted to receive the lower edge of a seat cushion, such as 31, to support said cushion by the metal frame common to the bottom of most seat cushions; ends 52 and 57 prevent seat cushion 31 from moving out of place, yet allow insertion of the cushion from the front of the support brackets 50 and 55 respectively; chains or other suitable flexible brackets prevent support brackets 50 and 55 from dropping too low; support brackets 50 and 55 are stepped to receive cushions or backs of different lengths.

In Fig. 11 I have shown an alternate design where it may be desirable to form a shelf over the rear of the vehicle floor deck below the windows and back of the second seat back, for luggage, dogs, etc.; pivoted rigid members or brackets, such as 60 and 65 shown in Figs. 9 and 11, provide lips 61 and 66 adapted to receive seat back 30, lips 62 and 67 adapted to receive seat cushion 31, and lips 63 and 68 adapted to receive shelf 70 to form a closure back of the second seat back. The seat cushions are preferably inverted for this shelf with hard bottoms suitable for receiving luggage on top thereof or a mattress for passenger resting in transit or at night and still provide luggage space below. If the adapter lips 61, 66, 62, and 67 are the right length so that the top of the seat back 30 and seat cushion 31 are held at the same top level, seat back 20 might be used in place of shelf 70 or forward of cushion 30 over seat 20 to form a longer shelf extending from the front seat clear to the rear of the car with all cushions at the same top level and all cushions facing up.

I claim as my invention:

1. A vehicle having a body with a pair of posts on opposite sides thereof, each post having stationary latch means thereon; a first passenger seat in said body having a first seat back whose upper end is lower than said latch means and adjacent to and rearward of said posts, the rear side of said back being provided with a plurality of tongue-receiving means; and a second passenger seat in said body rearward of said first seat and having a removable seat back provided with a plurality of tongues corresponding in number to said tongue-receiving means and adapted, when said removable seat back is removed, to fit rockably thereinto so that said removable seat back rests on top of said first seat back as a head rest, said removable seat back also having at each end a perforated tape swivel-mounted to said removable seat back and provided with a plurality of perforations engageable with a said stationary latch means, so as to anchor said removable seat back in place on said first seat back at an angle determined by which of said series of perforations is engaged by said latch means.

2. A vehicle having a body with a pair of posts on opposite sides thereof, each post having stationary latch means thereon; a first passenger seat in said body having a first seat back whose upper end is lower than said latch means and adjacent to and rearward of said posts, the rear side of said back being provided with a plurality of tongue-receiving means, floor boards in said body rearward of said first seat having a plurality of tongue-receiving pockets; and a second passenger seat in said body rearward of said first seat and having a removable seat back provided with a plurality of tongues corresponding in number to said tongue-receiving means and adapted, when said removable seat back is removed, to fit rockably thereinto so that said removable seat back rests on top of said first seat back as a head rest, and adapted, when said removable seat back is in place at said second seat to engage in said pockets, said removable seat back also having at each end a perforated tape swivel-mounted to said removable seat back and provided with a plurality of perforations engageable with a said stationary latch means, so as to anchor said removable seat back in place on said first seat back at an angle determined by which of said series of perforations is engaged by said latch means.

3. A vehicle having a body with windows and a roof and having interiorly, above said windows and spaced below said roof a pair of generally horizontal projecting ribs extending longitudinally; a seat cushion removably mounted in said body and having a bottom, the length of said seat cushions being less than the distance between said ribs and the height less than the distance between said ribs and said roof; and a pair of rigid extension members pivotally mounted on said seat cushion bottom for folding inwardly toward each other when said cushion is in its normal position as a seat and for folding outwardly for extending the length of said cushion when said cushion is removed so that said length is then slightly greater than the distance between said ribs, so that said cushion can then be stored above said ribs.

References Cited in the file of this patent

UNITED STATES PATENTS

| | | |
|---|---|---|
| 9,091 | Briggs | July 6, 1852 |
| 1,259,966 | Dyke | Mar. 19, 1918 |
| 1,415,209 | Troke | May 9, 1922 |
| 1,894,103 | Kuenzel | Jan. 10, 1933 |
| 2,140,968 | Paranzino | Dec. 20, 1938 |
| 2,347,025 | Benzick | Apr. 18, 1944 |
| 2,465,770 | Volsk | Mar. 29, 1949 |
| 2,582,687 | Fisher | Jan. 15, 1952 |
| 2,624,397 | St. Aubin | Jan. 6, 1953 |

FOREIGN PATENTS

| | | |
|---|---|---|
| 23,909 | Australia | Aug. 10, 1935 |
| 823,701 | Germany | Dec. 6, 1951 |
| 373,250 | Great Britain | May 17, 1932 |